United States Patent [19]

Sharp

[11] Patent Number: 5,892,559
[45] Date of Patent: Apr. 6, 1999

[54] CHROMATICITY COMPENSATING LIQUID CRYSTAL FILTER

[75] Inventor: Gary D. Sharp, Boulder, Colo.

[73] Assignee: ColorLink, Inc., Boulder, Colo.

[21] Appl. No.: 758,122

[22] Filed: Nov. 25, 1996

[51] Int. Cl.[6] .................... G02F 1/1347; G02F 1/1335
[52] U.S. Cl. ...................... 349/80; 349/120; 349/97; 349/119; 359/498; 359/499
[58] Field of Search ..................... 349/80, 97, 119, 349/120; 359/498, 499

[56] References Cited

U.S. PATENT DOCUMENTS

| | | | |
|---|---|---|---|
| 4,003,081 | 1/1977 | Hilsum et al. | 358/64 |
| 4,017,156 | 4/1977 | Moriyama et al. | 350/160 LC |
| 4,019,808 | 4/1977 | Scheffer | 350/160 LC |
| 4,025,164 | 5/1977 | Doriguzzi et al. | 350/160 LC |
| 4,232,948 | 11/1980 | Shanks | 350/347 R |
| 4,416,514 | 11/1983 | Plummer | 350/335 |
| 4,448,823 | 5/1984 | Clifford | 428/1 |
| 4,497,543 | 2/1985 | Aoki et al. | 350/337 |
| 4,582,396 | 4/1986 | Bos et al. | 350/347 |
| 4,635,051 | 1/1987 | Bos | 340/757 |
| 4,652,087 | 3/1987 | Bos et al. | 350/332 |
| 4,674,841 | 6/1987 | Buzak | 350/337 |
| 4,711,530 | 12/1987 | Nakanowatari et al. | 350/347 R |
| 4,726,663 | 2/1988 | Buzak | 350/347 E |
| 4,758,818 | 7/1988 | Vatne | 340/701 |
| 4,770,500 | 9/1988 | Kalmanash et al. | 350/347 E |
| 4,834,508 | 5/1989 | Fergason | 350/339 F |
| 4,867,536 | 9/1989 | Pidsosny et al. | 350/337 |
| 4,884,876 | 12/1989 | Lipton et al. | 350/347 E |
| 4,991,941 | 2/1991 | Kalmanash | 350/347 E |
| 5,033,825 | 7/1991 | Ishikawa et al. | 350/339 R |
| 5,050,965 | 9/1991 | Conner et al. | 359/53 |
| 5,082,354 | 1/1992 | Kalmanash | 350/339 F |
| 5,124,818 | 6/1992 | Conner et al. | 359/53 |
| 5,237,438 | 8/1993 | Miyashita et al. | 359/73 |
| 5,243,455 | 9/1993 | Johnson et al. | 359/93 |
| 5,347,378 | 9/1994 | Handschy et al. | 359/53 |
| 5,658,490 | 8/1997 | Sharp et al. | 349/96 |
| 5,751,384 | 5/1998 | Sharp | 349/97 |

FOREIGN PATENT DOCUMENTS

WO90/09614  8/1990  WIPO.

OTHER PUBLICATIONS

Schadt, M. and Fünfschilling, J. (1990), "New Liquid Crystal Polarized Color Projection Principle," *Jpn. J. Appl. Phys.* 29(10):1974–1984.

Scheffer, T.J. (1973), "New multicolor liquid crystal displays that use a twisted nematic electro-optical cell," *J. Appl. Phys.* 44(11):4799–4803.

Wright, H. et al. (May 1996), "Active filters enable color imaging," Laser Focus World, pp. 85–90.

*Primary Examiner*—William L. Sikes
*Assistant Examiner*—Julie Ngo
*Attorney, Agent, or Firm*—Fleshner & Kim

[57] ABSTRACT

This invention provides chromaticity compensation for color filters having nematic liquid crystal tuning elements, as well as fast-transition tuning units for use in combination with chromaticity compensation. The filters of this invention have two stages formed by three linear polarizers in series, as least two of which are color polarizers. Within each stage is a tuning unit comprising a nematic liquid crystal cell switchable between a first state wherein the polarization of light is orthogonally transformed and a second state wherein the polarization is unchanged. In the first state the liquid crystal cell chromaticity introduces significant distortion to the filter stage, but in the second state it does not. Chromaticity compensation is achieved in this invention by optimizing the use of the undistorted normal states and by judicious choice of the design wavelengths of the liquid crystal cells. This invention further provides compound tuning units, for use in the chromaticity compensating filter, that allow the use of fast unenergized-to-energized transitions in switching between three primary colors. A first embodiment of the compound tuning unit uses a half-wave bias retarder oriented at ±45° in combination with the nematic liquid crystal cell. A second embodiment of the compound tuning unit uses two nematic liquid crystal cells. A third embodiment of the compound tuning unit uses a half-wave bias retarder oriented at about ±67° or ±23° in combination with the nematic liquid crystal cell.

41 Claims, 17 Drawing Sheets

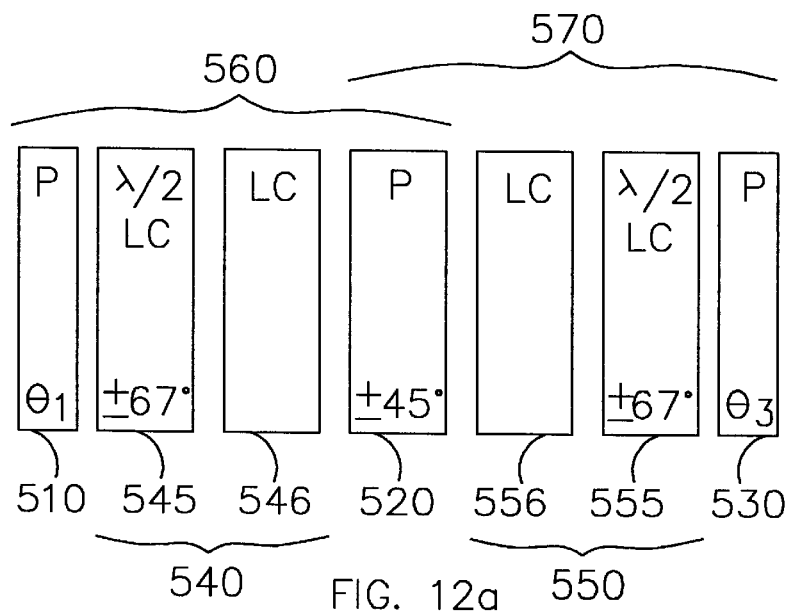
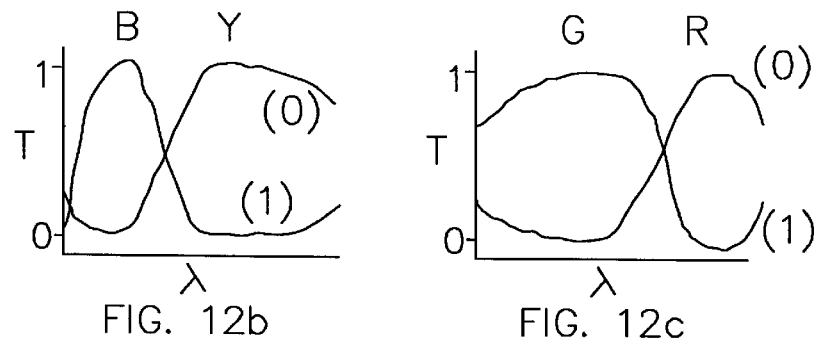
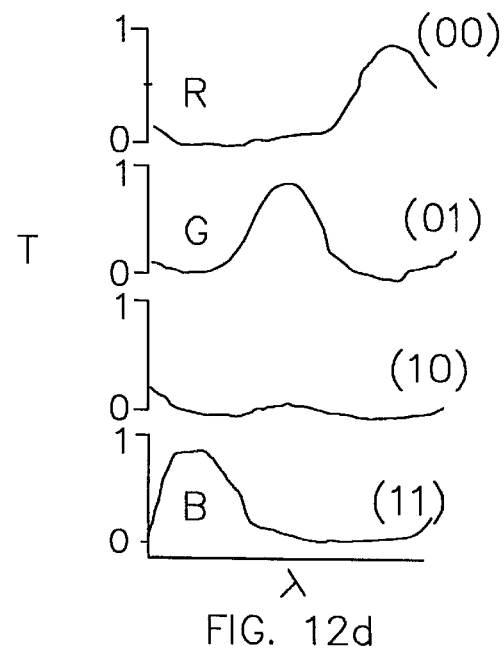
FIG. 12a
FIG. 12b
FIG. 12c
FIG. 12d

CHROMATICITY COMPENSATING LIQUID CRYSTAL FILTER

BACKGROUND OF THE INVENTION

1. Field of the Invention

This invention relates to color filters having nematic liquid crystal cells, and to compensating for the chromaticity of the nematic cells and utilizing fast transitions of the nematic cells in switching the color filters.

2. Background of the Invention

Switched-polarizer-filters (SPFs) have one or more stages, each stage consisting of a color polarizer and a two state polarization switch. The color polarizer provides different transmission spectra along orthogonal polarization axes, and the polarization switch is a switchable analyzer which selects which of the two polarizations is transmitted. The SPF is intrinsically binary tunable, such that each filter stage permits switching between two colors. Stages are cascaded in order to provide additional output colors.

Color polarizers used in SPFs are generally dye-type pleochroic color polarizing filters (for example in U.S. Pat. No. 4,582,396 to Bos, U.S. Pat. No. 4,416,514 to Plummer, U.S. Pat. No. 4,758,818 to Vatne and U.S. Pat. No. 5,347,378 to Handschy). Dye-type pleochroic color polarizers are films that function as linear polarizers in specific wavelength bands. They are formed by doping a polymer with long-chain pleochroic dyes. Incident white light polarized along one axis is fully transmitted, but is selectively absorbed along the orthogonal axis. For instance, a cyan color polarizer functions as a linear polarizer by absorbing the red along one axis. A color polarizer that passes a primary color (either additive or subtractive) along each axis can be formed as a composite consisting of two films with crossed axes. Colors are typically selected using crossed complementary color (eg. red/cyan) polarizer films coupled with a switchable polarizer. A full color device can comprise five polarizing films (one neutral), and two switching means.

Recently, polarizer-retarder-stack (PRS) color polarizers have been described (U.S. patent application Ser. No. 08/447,522, filed May 23, 1995, and now U.S. Pat. No. 5,751,384, which is incorporated by reference herein in its entirety). The PRS comprises a linear polarizer in combination with a stack of retarders. The number of retarders in the stack and the retardances and orientations of the retarders are selected such that an additive primary spectrum is transmitted along a first polarization axis and the complementary subtractive primary spectrum is transmitted along the orthogonal polarization axis.

The polarization switch in a SPF can be a liquid crystal (LC) cell in combination with a static polarization analyzer. The switch optimally provides neutral polarization switching. Unfortunately, the performance of these filters is significantly degraded by the chromatic nature of the liquid crystal active element. In general, liquid crystal cells accurately switch between orthogonal polarizations in only one spectral region. Outside of this region the filters are subject to leakage of the blocked bands and reduced throughput of the pass-band.

Smectic liquid crystal polarization switches generally comprise a linear polarizer and a liquid crystal half-wave retarder with fixed retardance and rotatable orientation. Rotating the optic axis of the liquid crystal cell between 0° and 45° with respect to the polarizer switches the polarization between two orthogonal axes. Achromatic smectic liquid crystal polarization switches have recently been described (U.S. patent applications Ser. No. 08/419,593, filed Apr. 7, 1995, now U.S. Pat. No. 5,658,490, and Ser. No. 08/549,963, filed Oct. 30, 1995), and can be used to provide high quality color filters.

Nematic liquid crystal polarizations switches generally comprise a linear polarizer and a nematic liquid crystal cell with fixed orientation and variable retardance. The achromatic polarization switches developed for smectic liquid crystal cells cannot be employed with nematics, leaving nematic liquid crystal color filters beset with leakage and low throughput.

A second drawback to nematic liquid crystal filters is their slow switching speed. Nematic liquid crystal cell typically take a few hundred microseconds to realign in response to an applied electric field and much longer, several milliseconds to reset to the unenergized state. Because of the slow response time, the rate at which the filter can sequence through the three primary colors is limited, which in turn limits the rate at which subframes can be acquired or displayed for camera or display applications.

BRIEF SUMMARY OF THE INVENTION

This invention provides chromaticity compensation for color filters having nematic liquid crystal tuning elements, as well as fast-transition tuning units for use in combination with chromaticity compensation. The filters of this invention have two stages formed by three linear polarizers in series, as least two of which are color polarizers. Within each stage is a tuning unit comprising a nematic liquid crystal cell switchable between a first state wherein the polarization of light is transformed to the orthogonal state (orthogonally transformed) and a second state, the "normal" state, wherein the polarization of light is unchanged. In the first state the liquid crystal cell chromaticity introduces significant distortion to the filter stage, but in the second state it does not. Chromaticity compensation is achieved in this invention by optimizing the use of the undistorted normal states and by judicious choice of the design wavelengths of the liquid crystal cells.

The chromaticity compensating filter of this invention has first and second stages which normally transmit first and second subtractive primary colors, respectively, and normally block first and second additive primary colors. Since two of the primary colors can be simultaneously blocked by both stages (redundant blocking), one of the stages being the normal, undistorted state, the filter does not suffer leakage of these colors. The third primary color does not benefit from redundant blocking and furthermore is only blocked when the liquid crystal cell is in the chromatic state. It is therefore the most compromised by the chromaticity of the liquid crystal cells and is most at risk of leaking. To optimize blocking of the third primary color, the design wavelength of the liquid crystal cells preferably falls within the region of the third primary color.

This invention further provides compound tuning units, for use in the chromaticity compensating filter, that allow the use of fast transitions in switching between three primary colors. Since nematic liquid crystal cells typically have faster rise times than fall times, fast transitions are achieved by using only the unenergized to energized transitions to sequence through the three states. The sequence can be represented digitally as 00, 01 (or 10), and 11, where 0 is an unenergized state and 1 is an energized state. The key is to make these three states correspond to high quality red, green and blue transmission spectra. In the chromaticity compensating filter described above, the switching states corresponding to the three primary colors are 01, 10 and 11, requiring a slow transition in the sequence.

A first embodiment of the compound tuning unit of this invention uses a bias retarder in combination with the nematic liquid crystal cell to pre- or post-condition the polarization of light through the liquid crystal cell. The bias retarder is a half-wave retarder oriented at ±45°, and it orthogonally transforms the polarization of light within the stage. The nematic cell reverses the transformation. The chromaticity caused by the first transformation is reversed by the second transformation. For the compound tuning unit, the unenergized nematic corresponds to the normal state of the tuning unit, wherein the polarization of light is unchanged, while the energized nematic corresponds to the orthogonally transforming state. For the chromaticity compensating filter having this compound tuning unit in one stage, the switching states 00, 01 and 11 therefore provide the three primary colors, and the sequence uses only fast transitions.

Another embodiment of the compound tuning unit uses two nematic liquid crystal cells. Like the passive bias retarder, the second nematic cell within one stage nullifies the chromaticity caused by the first liquid crystal cell and allows switching sequences wherein all the transitions are from unenergized to energized states.

An alternative compound tuning unit uses a half-wave bias retarder oriented at about ±67° or ±23° in combination with the nematic liquid crystal cell. A nematic liquid crystal cell is chromatic in the unenergized state. In the compound tuning unit having a half-wave bias retarder at ±45°, the tuning unit is chromatic when the liquid crystal cell is in the energized state. Using a bias retarder at about ±67° or ±23° to pre- or post-condition the polarization divides the chromaticity between the unenergized and energized states of the liquid crystal cell. This compound tuning unit reflects light by 45° in the unenergized state and by −45° in the energized state, both states having similar chromaticity. The exit polarizer of the stage is oriented at ±45° with respect to the entrance polarizer to separate the two switching states. Both stages of the two-stage filter can use the compound tuning unit, with the orientations of the exit polarizer being adjusted accordingly. Because the chromaticity is divided between the two states of the tuning unit, the transmission spectra of both states have tolerable distortion. Neither of the switching states can properly be called the normal state because in both states the tuning unit transforms the polarization. The filter can be fabricated with either the energized or the unenergized state transmitting a subtractive primary, and the filter can designed to use only fast transitions in switching through the three additive primary colors.

BRIEF DESCRIPTION OF THE DRAWING

FIG. 1, comprising

FIG. 2, comprising

FIG. 4, comprising

FIG. 5, comprising

FIG. 7, comprising

FIG. 12, comprising FIGS. 12 a–d, is (a) a two stage filter having a bias retarder in the tuning unit of each stages, (b) the transmission of the first stage, (c) the transmission of the second stage and (d) the transmission of the two stages in combination.

DETAILED DESCRIPTION OF THE INVENTION

Figure 1A:
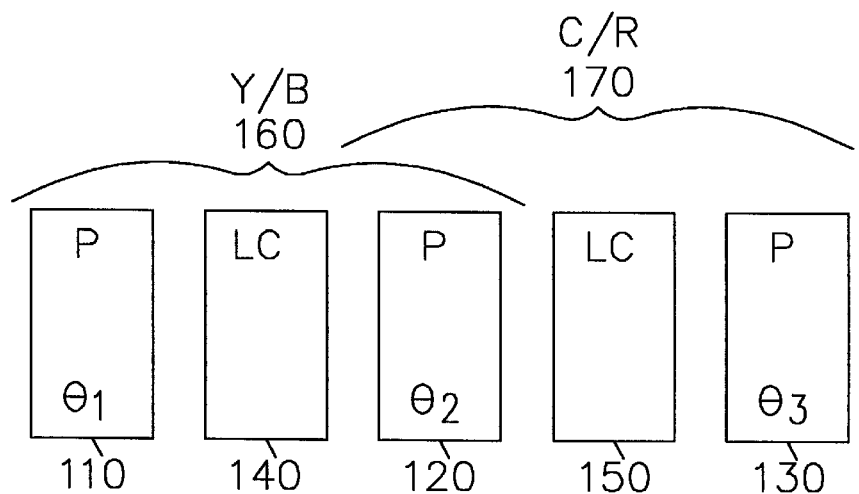
FIGS. 1a–d, is (a) a two stage filter having a normally additive primary and a normally subtractive primary stage, (b) the transmission of the normally additive stage, (c) the transmission of the normally subtractive stage, and (d) the transmission of the two stages in combination.

This invention provides two stage filters which compensate for the chromaticity of nematic liquid crystal cells. The problem of nematic liquid crystal chromaticity on a two stage switched-polarizer-filter is illustrated in FIG. 1. The filter comprises first and second stages 160 and 170. Although the stages are called first and second, light can traverse the two stages in either order. The first stage is defined by entrance polarizer 110 and exit polarizer 120, and contains nematic liquid crystal cell 140. The second stage is defined by entrance polarizer 120 and exit polarizer 130, and contains nematic liquid crystal cell 150. The two stages share center polarizer 120. At least two of the polarizers, one in each stage, are color polarizers. The term color polarizer is used herein for an element which transmits a first spectrum of light along one polarization axis and a second spectrum along the orthogonal polarization axis. It is preferred that the first and second spectra are complementary spectra, i.e. the combined spectra give white light.

In the SPF, the color polarizers provide different transmission spectra along the two polarization axes and the liquid crystal cells switch the polarization to select between the spectra. Liquid crystal cells 140 and 150 are switchable between a first state wherein the polarization of light is orthogonally transformed and a second state wherein the polarization of light is unchanged. In the orthogonally transforming state, nematic cells function chromatically. At the design wavelength the liquid crystal cell orthogonally transforms the polarization while maintaining the linearity. For zero-twist nematics, at other wavelengths the polarization becomes elliptical, with the handedness depending on whether the wavelength is longer or shorter than the design wavelength. For twisted nematics the polarization remains linear but is rotated by more than or less than 90° for wavelengths away from the design wavelength. In the second switching state, wherein the polarization is unchanged, nematic cells are more nearly achromatic. The term design wavelength is used herein for the wavelength at which a liquid crystal cell most nearly provides orthogonal transformation and preserves linear polarization. For passive retarders the design wavelength refers to the wavelength at which the specified retardance is obtained.

Figure 1B:
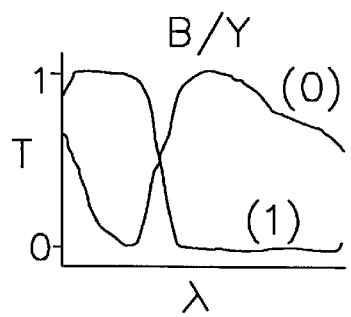
Figure 1C:
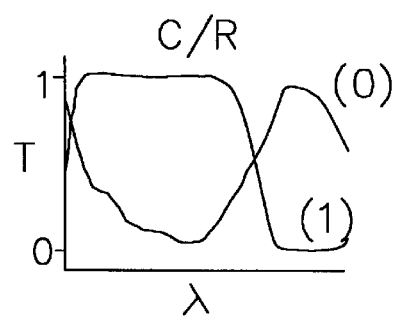
Figure 1D:
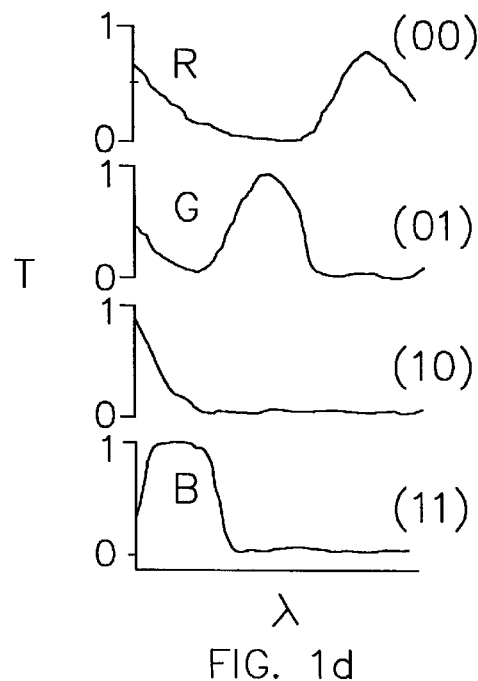
Figure 2A:
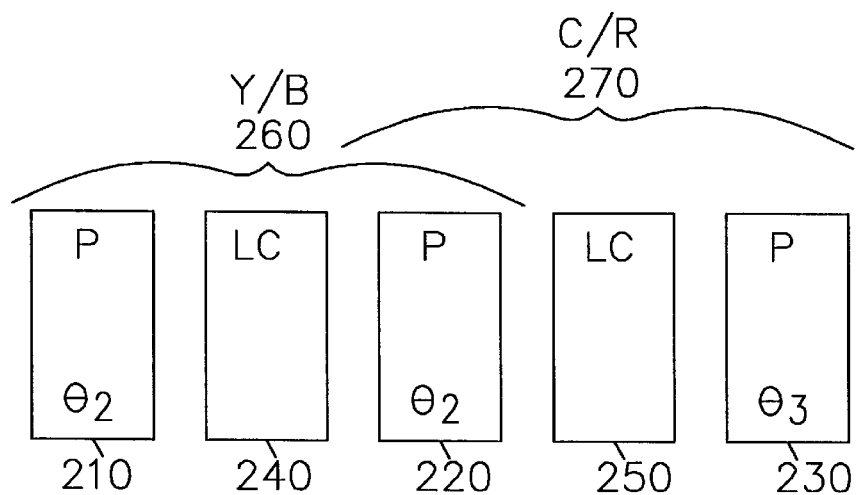
FIGS. 2a–d, is (a) a two stage filter having two normally subtractive primary stages, (b) the transmission of the first stage, (c) the transmission of the second stage, and (d) the transmission of the two stages in combination.
Figure 2B:
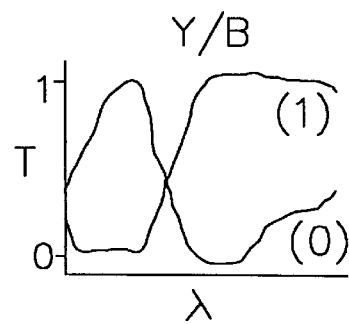
Figure 2C:
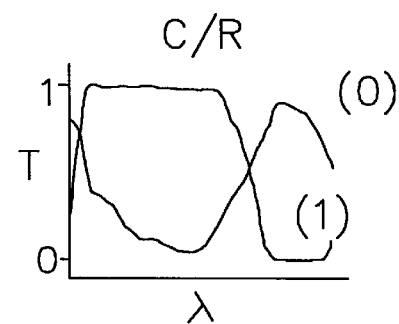
Figure 2D:
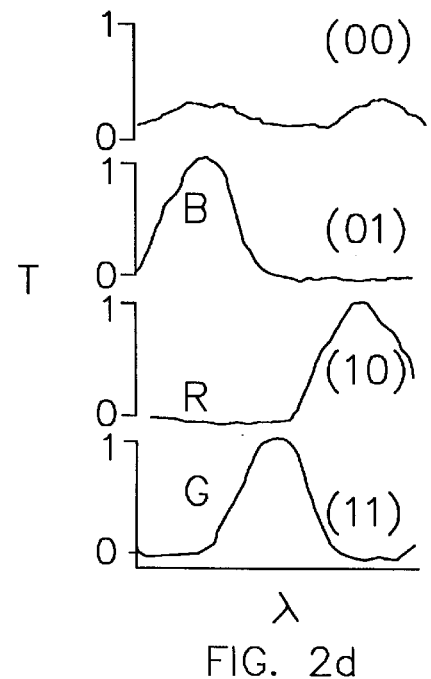

The chromaticity of the nematic cell in the orthogonally transforming state degrades the filter performance. FIGS. 1b–d show schematically the effect of nematic cell chromaticity on filter performance. The spectra do not correspond to a specific filter design but are illustrative of the class of filters. Filter stage 160 transmits a yellow spectrum in the first switching state (the unenergized state 0) and a blue spectrum in the second switching state (the energized state 1), as shown in FIG. 1b. The blue spectrum is relatively undistorted, but the yellow spectrum is distorted, resulting in reduced transmission in the red and leakage in the blue. Similarly stage 170 is switchable between an undistorted cyan spectrum and a distorted red spectrum. The term distorted refers to changes in the spectrum compared to what would be obtained with an ideal polarization analyzer.

The first stage is called normally blue and the second is called normally cyan, where the term normal transmission refers to the transmission that would be produced in the absence of a tuning element. The normal transmission of a stage is determined by the transmission properties of the color polarizer and the orientations of the entrance and exit polarizers. A filter stage can be designed to normally transmit an additive primary (red (R), green (G), blue (B)) or a subtractive primary (cyan (C), magenta (M), yellow (Y)). In labeling a filter stage herein, the normal color is named first, eg. B/Y for the normally blue stage and C/R for the normally cyan stage.

The combined transmission spectra of the filter is the product of the spectra for the individual stages. FIG. 1d shows transmission spectra for the four switching states. When both cells are unenergized, the 00 state, the filter transmits a red spectrum. Because both stages are distorted in the 00 state, there is significant loss of red light and leakage of blue. In the 01 state the transmission is green. The red is well blocked by the 1 state of the C/R stage, but there is leakage in the blue since blue is only blocked by the distorted 0 state of the Y/B stage. The 10 state is a black spectrum with some blue leakage. The 11 state is a high quality blue spectrum since the liquid crystal cells of both stages are in their achromatic states. Thus for the filter with one normally additive primary stage and one normally subtractive primary stage, only one of the RGB spectra is high quality and two suffer leakage due to the chromaticity of the nematic liquid crystal cells.

The filter of the present invention solves this problem by using two stages with normally subtractive primary spectra, as shown in FIG. 2. In the illustrated embodiment, stage 260 is a Y/B stage comprising polarizers 210 and 220, oriented at $\theta_1$ and $\theta_2$, and nematic liquid crystal cell 240. For simplicity, $\theta_1$ is called zero and is used as the reference angle for the other elements. Stage 270 is a C/R stage comprising polarizers 220 and 230, oriented at $\theta_2$ and $\theta_3$, and nematic liquid crystal cell 250. Spectra of the individual stages in the normal state 1 and the distorted state 0 are shown schematically in FIGS. 2b–c, and the combined transmission is shown in FIG. 2d. The distortion of both stages is combined in the 00 state, which is black and is not typically needed in an RGB filter. The 01 state is blue. In this state there is minimal red leakage because the C/R stage in the 1 state provides undistorted blocking in the red. The Y/B stage in the 0 state blocks both the green and the red. However, because the filter in the 01 state has redundant blocking in the red, i.e. both stages contribute to blocking the red, the Y/B stage need not provide ideal blocking in the red and can instead be designed to optimize the green blocking. This can be done by choosing the design wavelength of liquid crystal cell 240 to be in the green.

Similarly, in the red transmission spectrum of the 10 state, blue is well blocked by the Y/B stage and, because there is redundant blocking in the blue, the design wavelength of liquid crystal cell 250 can be selected to provide effective blocking of the green by the C/R stage. In the green spectrum of the 11 state, there is no redundant blocking of either the blue of red. Blue is blocked only by the Y/B state and red by the C/R stage. However, since both stages are in their undistorted states excellent blocking is nonetheless provided. Thus in the chromaticity compensating filter of FIG. 2, high throughput and good spectral purity are achieved for red, green and blue, in spite of the chromaticity of the nematic liquid crystal cells.

The chromaticity compensating filter has been illustrated with Y/B and C/R stages. Other combinations of subtractive primaries can alternatively be used. For the case of Y/B in combination with M/G, for optimum performance both liquid crystal cells have design wavelengths in the red, and for the case of C/R in combination with M/G, both liquid crystal cells have design wavelengths in the blue. In general, the 0 states are designed to optimize blocking of the additive primary color in which the two normally subtractive primaries overlap, because that color is never blocked by an undistorted normal state.

The exact choice of the design wavelengths depends on the components used to construct the filter and on the requirements of the application. The design wavelengths are generally within the region of overlap of two subtractive primaries, but they may be in the center of the region or on either edge. The design wavelengths of the two liquid crystal cells may be the same or different. For example, in the filter of FIG. 2, the throughput of blue in the 01 state and red in the 10 state can be optimized when cell 240 has a design wavelength slightly on the blue side of green and cell 250 has a design wavelength slightly on the red side of green.

Cells 240 and 250 are nematic liquid crystal cells having a first switching state wherein the polarization is orthogonally transformed and a second state wherein the polarization is unchanged. The nematic liquid crystal cells are preferably zero-twist cells such as electrically controlled birefringence cells, both homogeneously and homeotropically aligned, and π-cells (surface mode cells). For π-cells in the nominally unenergized state, it is preferable to use a low amplitude square wave as a holding voltage to prevent the cell from going into a twisted state. For the zero-twist cells the orientation of the retarder is fixed at ±45° with respect to the polarizer, and the retardance is switched between half-wave (unenergized) and zero (energized). In the half-wave retarding state the polarization is reflected through the optic axis of the retarder to produce an orthogonal transformation. In lieu of zero-twist cells, twisted nematic (TN) and super twisted nematic (STN) cells can be used. Twisted cells produce an orthogonal transformation by rotating the polarization. For liquid crystals having a positive dielectric anisotropy the unenergized state causes an orthogonal transformation and the energized state leaves the polarization nearly unchanged. Since commercial nematics have positive anisotropy, the filter is described with reference to this class. For negative dielectric anisotropy nematics the energized state causes an orthogonal transformation and the filter switching needs to be modified accordingly.

In the second switching state of the nematic cells the polarization is nominally unchanged. In fact, even when energized nematic cells have some residual retardance. Therefore the term unchanged polarization as used herein refers to approximately unchanged polarization. In the filters of this invention, the residual retardance can be reduced as taught by Lipton et al. (U.S. Pat. No. 4,884,876) by adding a quarter-wave retarder to the exit polarizer and tilting the polarization axis slightly. Alternatively, the residual retardance can be nullified by adding a crossed retarder having a retardance matched to the residual retardance.

At least two of polarizers 210, 220 and 230 are color polarizers, so that each stage has at least one color polarizer. A stage can have a color polarizer as either the entrance or the exit polarizer. Suitable color polarizers include dye-type pleochroic color polarizers and polarizer-retarder-stacks. The transmission properties of the color polarizers and the orientations of the entrance and exit polarizers are selected to provide the desired normal transmission function for each stage. To transmit an additive primary color on one axis and the complementary subtractive primary on the other axis, dye-type color polarizers general utilize two films with crossed axes. The transmission spectra of PRS polarizers are determined by the number of retarders in the stack and by the retardances and orientations of the retarders.

The filter can use a dye-type polarizer in one stage and a PRS in the other. Hybrid-polarizer-retarder-stacks can also be used comprising a dye-type pleochroic polarizer in combination with a retarder stack. In this case the two orthogonal axes do not transmit complementary spectra and can instead transmit a subtractive primary on each axis. For example, a red dye-type polarizer in combination with a B/Y stack creates a M/Y color polarizer. A filter with a hybrid polarizer does not transmit RGB but can be useful for some applications. For embodiments having PRS color polarizers, the liquid crystal cell can be positioned between the retarder stack and the second polarizer of the stage. It can alternatively be positioned within the PRS between the retarder stack and the neutral polarizer of the PRS. For the case of PRS color polarizers, the term positioned between first and second polarizers is used herein to mean positioned between the neutral polarizer of the PRS and the second polarizer, and includes positioning between the neutral polarizer of the PRS and the retarder stack.

Figure 3:
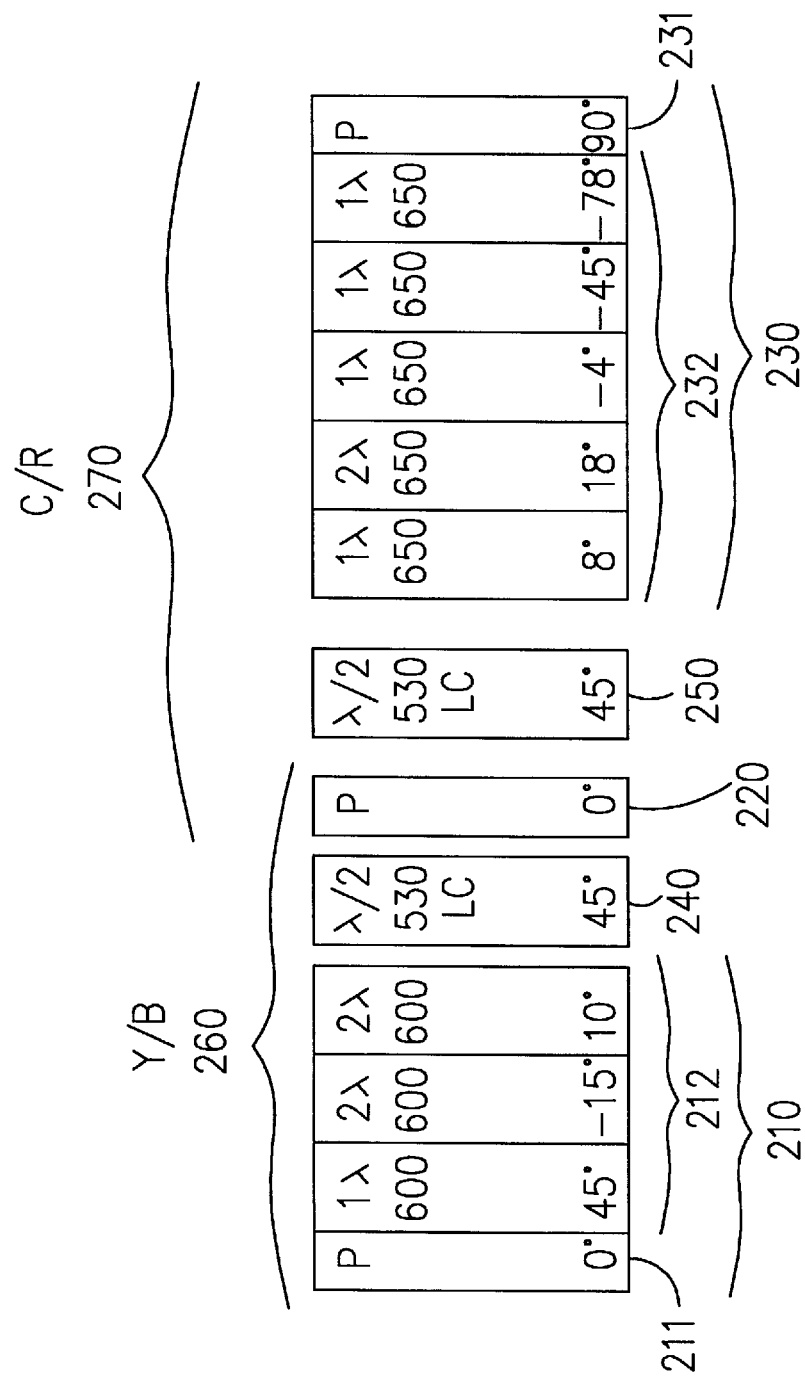
FIG. 3 is an embodiment of the filter of FIG. 2.

An embodiment of the chromaticity compensating filter using two PRS color polarizers is shown in FIG. 3. Polarizers are labeled P and have the orientation of the polarization axis in the bottom of the box. Orientations are defined with respect to the orientation of the entrance polarizer at 0°. Passive retarders have the retardance and the design wavelength in the top of the box and the orientation of the optic axis in the bottom. Liquid crystal cells are labeled LC. In this embodiment they are zero-twist cells and have the retardance and design wavelength in the top of the box and the orientation of the optic axis in the bottom.

Stage 260 is defined by color polarizer 210 and neutral polarizer 220, and contains liquid crystal cell 240. Entrance polarizer 210 is a PRS comprising neutral polarizer 211 and retarder stack 212. For this particular retarder stack, because neutral polarizers 211 and 220 are parallel the stage normally transmits yellow and normally blocks blue. Were they crossed it would normally transmit blue. Stage 270 is defined by polarizers 220 and 230 and contains liquid crystal cell 250. Exit polarizer 230 is a PRS comprising neutral polarizer 231 and retarder stack 232. This stage normally transmits cyan and normally blocks red. The two normally subtractive primaries, yellow and cyan, overlap in the green. Accordingly the liquid crystal cells are half-wave retarders in the green at 530 nm.

Figure 4A:
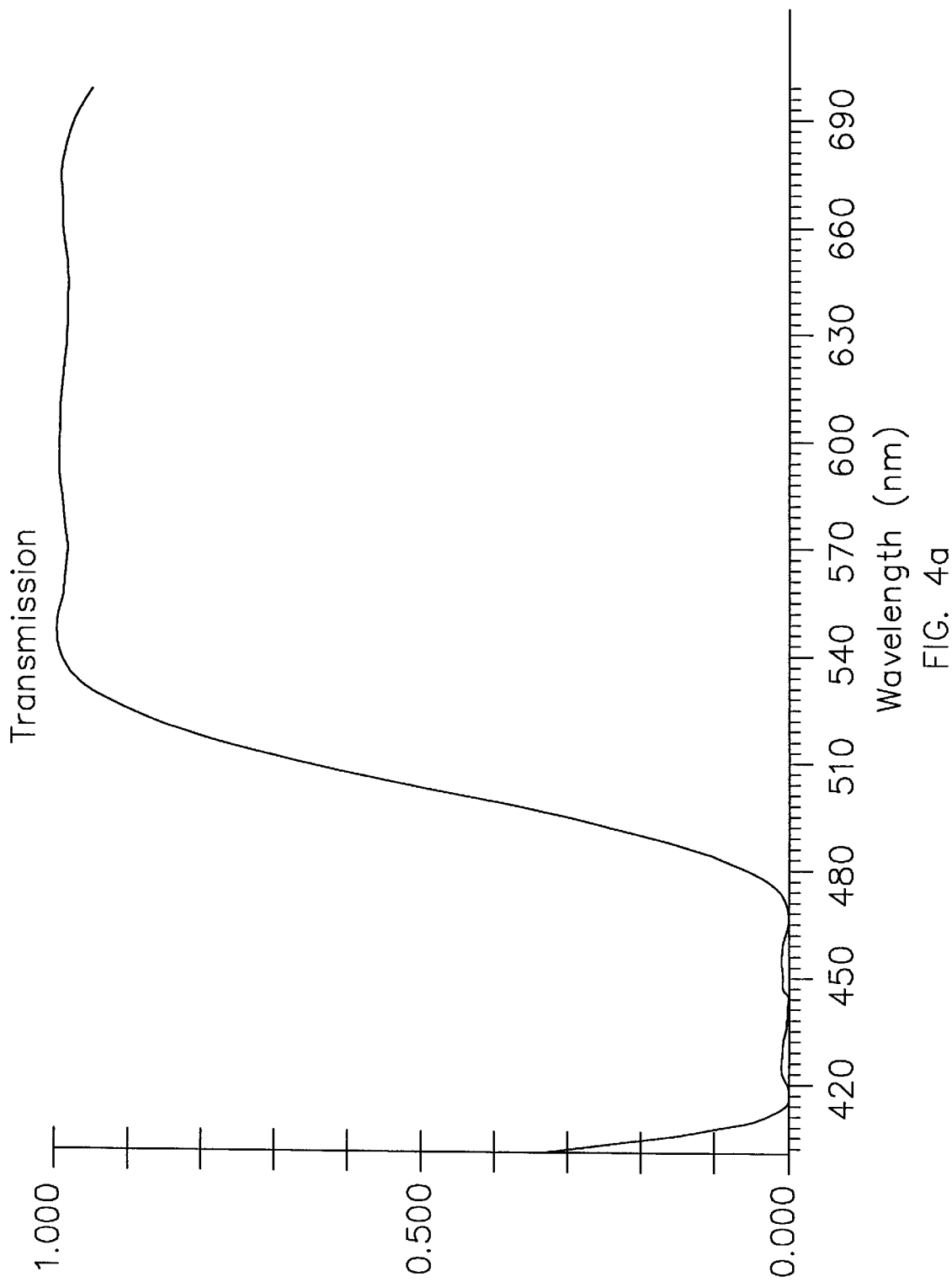
FIGS. 4a–b is the transmission of the Y/B stage of the filter of FIG. 3 in (a) the normally subtractive state and (b) the additive state.
Figure 4B:
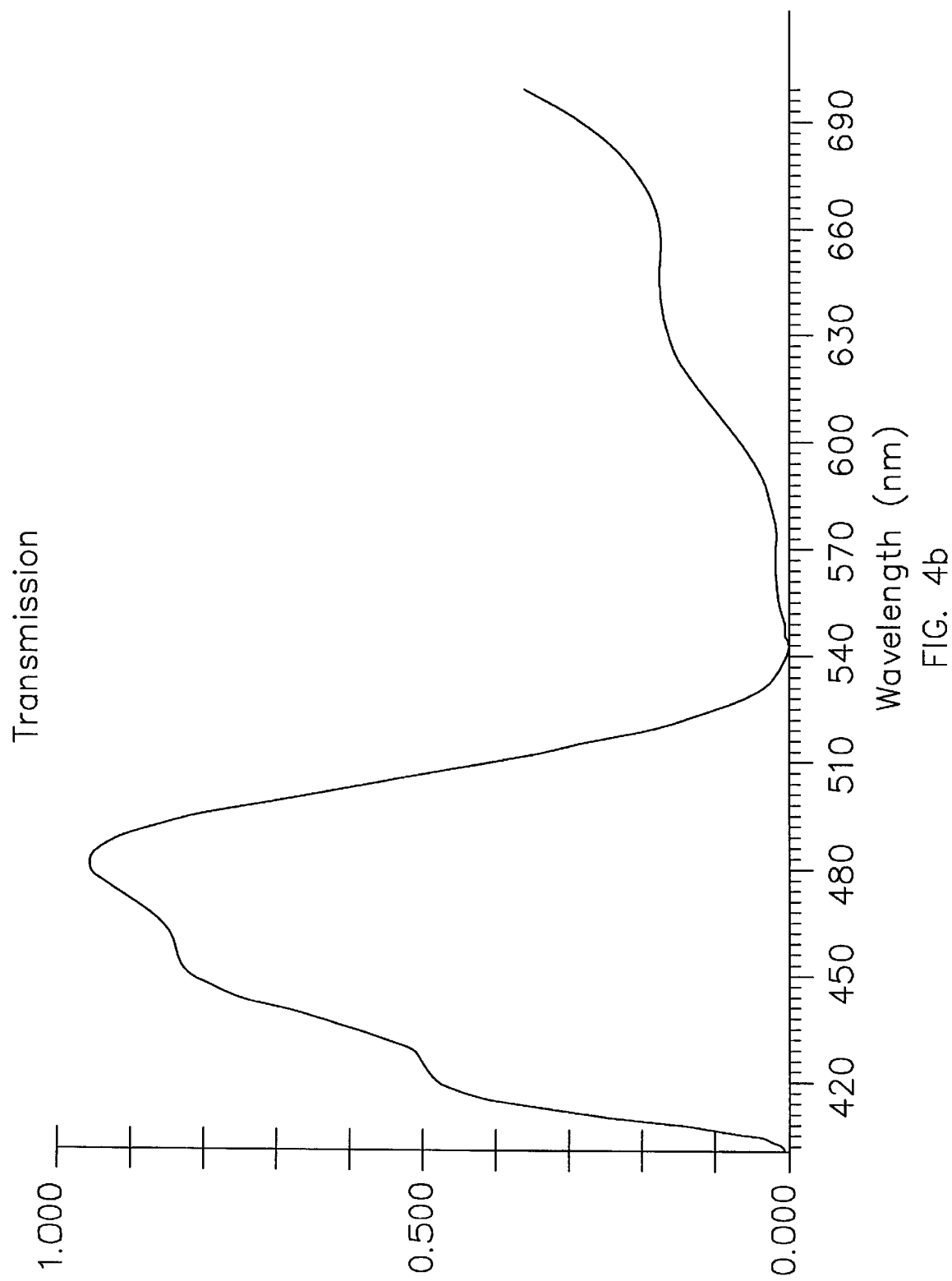
Figure 5A:
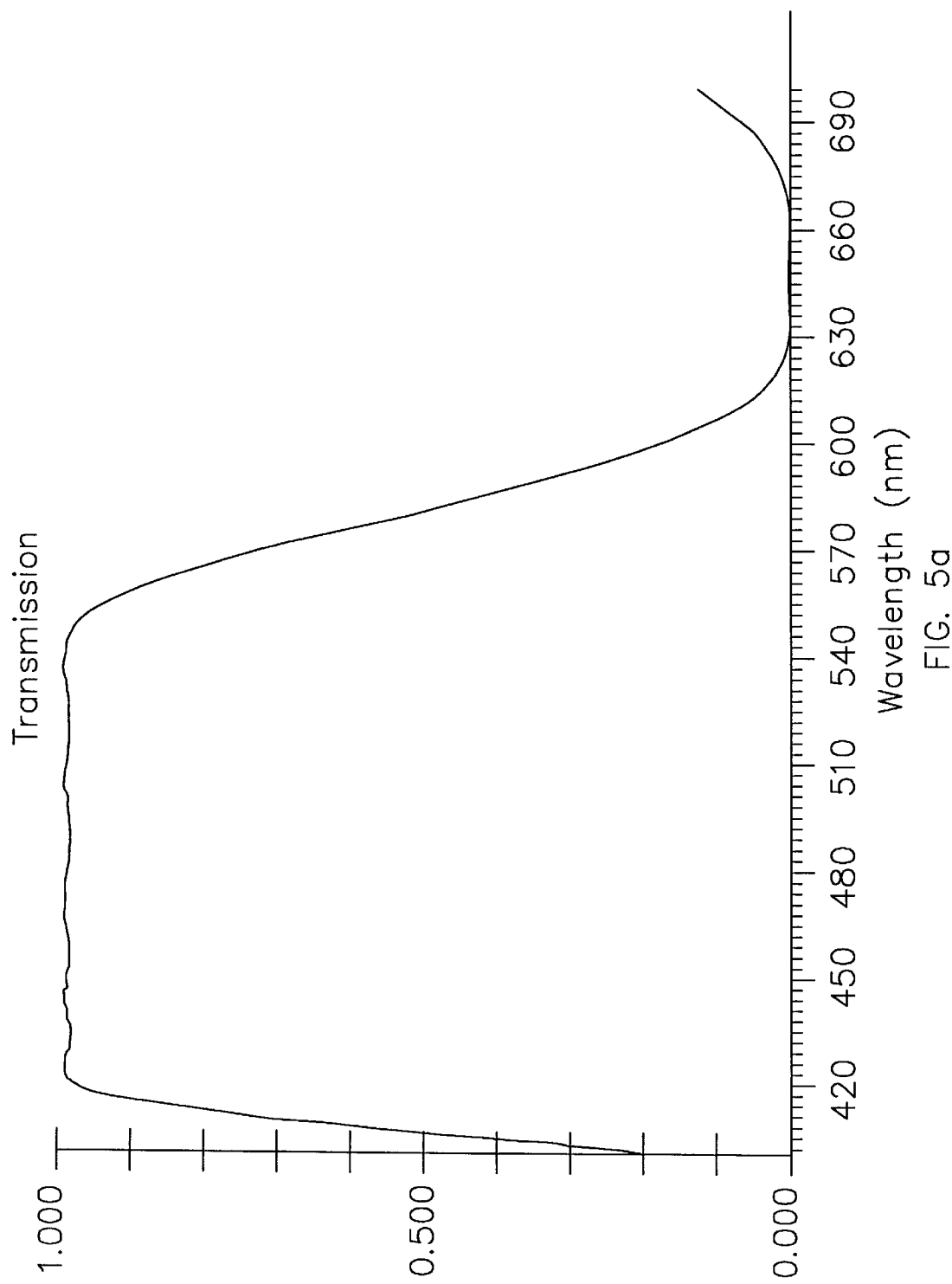
FIGS. 5a–b is the transmission of the C/R stage of the filter of FIG. 3 in (a) the normally subtractive state and (b) the additive state.
Figure 5B:
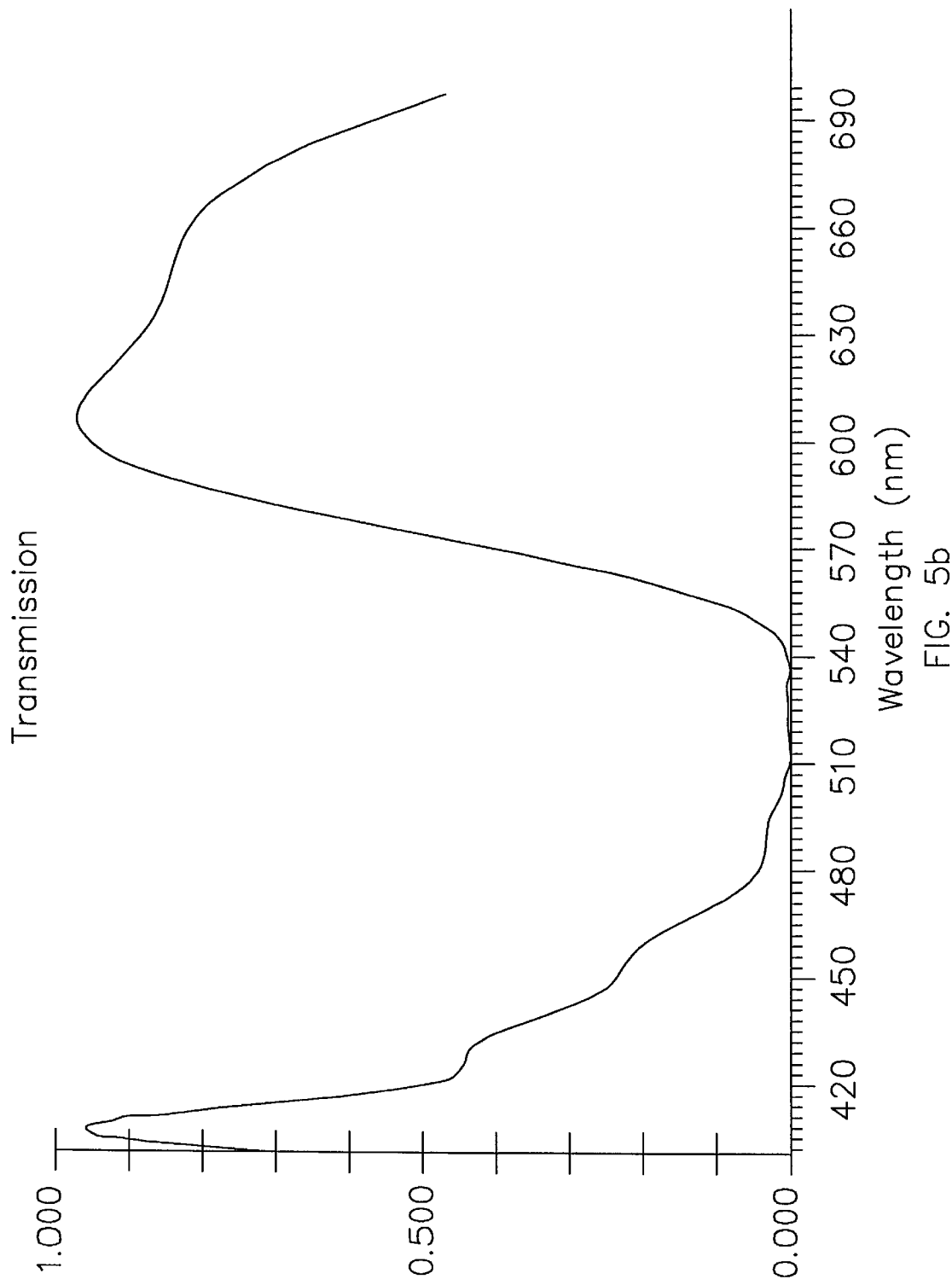

The calculated transmission spectrum of the Y/B stage, assuming ideal neutral polarizers, is shown in FIG. 4. The normal yellow state (FIG. 4a) occurs when the liquid crystal cell is energized and is achromatic throughout most of the visible range. In the unenergized state the liquid crystal cell inverts the yellow output and produces blue (FIG. 4b). The performance is near ideal from the mid blue through the green band, in the vicinity of the design wavelength, but has significant leakage in the red. FIG. 5 shows the cyan state (FIG. 5a) and the red state (FIG. 5b) of the C/R stage. The red state performs well from the mid red through the green but has significant blue leakage. In the filter the two stages cooperate, each compensating for the chromaticity of the other. In the 01 blue state, the cyan state of the C/R stage corrects for the red leakage of the Y/B stage while still passing all the blue. In the red 10 state, the blue leakage of the red state of the C/R stage is blocked by the Y/B stage in the yellow state.

Figure 6:
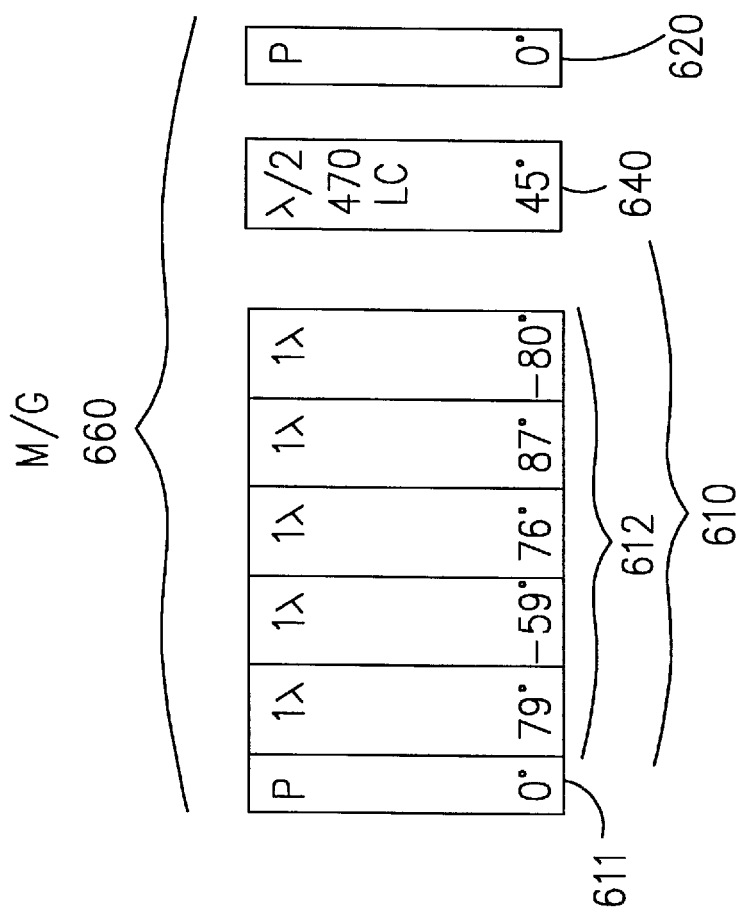
FIG. 6 is a M/G filter stage using PRS color polarizers.
Figure 7A:
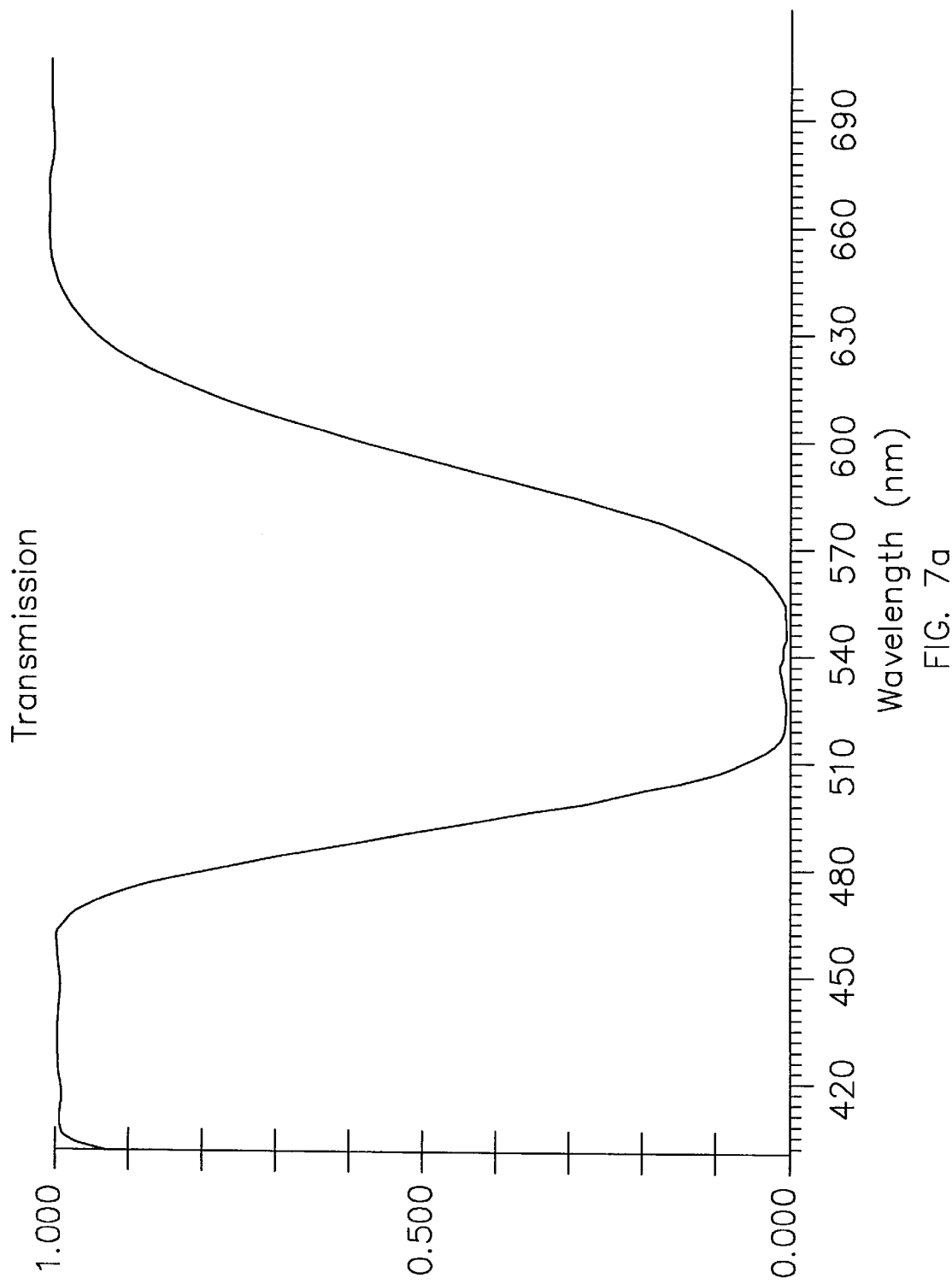
FIGS. 7a–b is the transmission of the M/G stage of FIG. 6 in (a) the normally subtractive state and (b) the additive state.
Figure 7B:
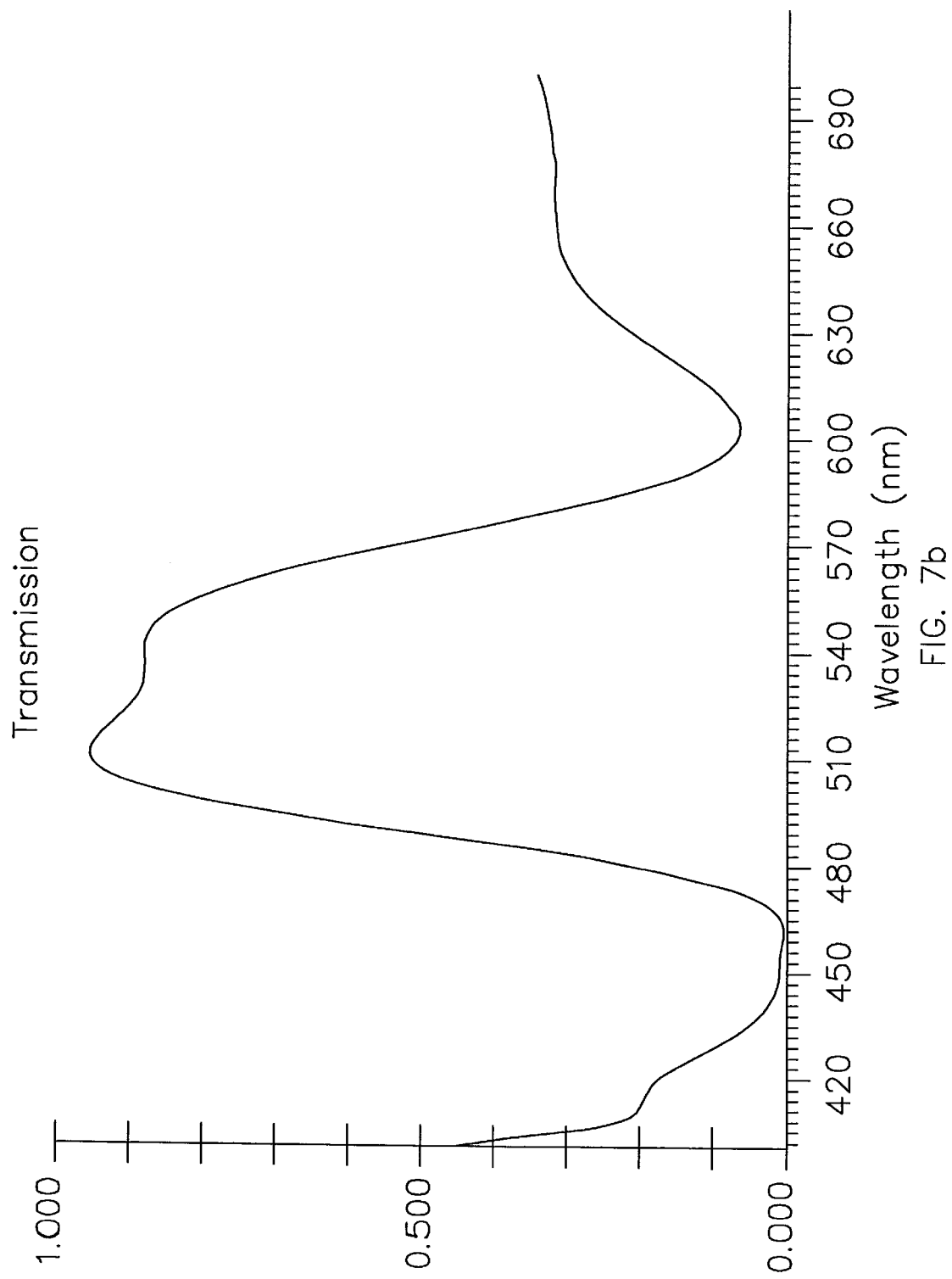

The two stage filter has been illustrated with Y/B and C/R stages. Either of these stages can alternatively be combined with a normally subtractive primary M/G stage. A suitable stage is shown in FIG. 6. Color polarizer 610 and neutral polarizer 620 define the stage containing liquid crystal cell 640. The color polarizer is a PRS comprising neutral polarizer 611 and retarder stack 612. The design wavelength of the liquid crystal cell is 470 nm, making this stage particularly suitable for use in combination with a C/R stage. If the M/G stage were to be used with a Y/B stage, the preferred design wavelength would be in the red region, i.e. in the region of overlap of magenta and yellow. FIGS. 7a–b show the normal magenta spectrum and the switched green spectrum of this stage.

The chromaticity compensating filter of has been illustrated with zero-twist liquid crystal cells oriented at 45°. They can alternatively be oriented at −45°. It has been illustrated with the first and third polarizers being color polarizers. Alternatively the center polarizer and one other polarizer can be color polarizers. For the case of PRS color polarizers, the center polarizer can be a single neutral polarizer sandwiched between two retarder stacks, one for each stage. Differences in the output spectra can result from each of these variations in configuration. When selecting a preferred structure, it is desirable to consider the transmission characteristics of all possible configurations. The preferred form is usually the one which provides the highest transmission efficiency and color contrast. However, there can be other design variations based on the characteristics of the input spectrum or other considerations. For instance, it may be desirable to generate a specific color coordinate or to provide some color balancing.

The filter of FIG. 2 is designed to yield good RGB spectra with the simplest structure. However, in applications such as cameras transition speed is an additional consideration. For example, there are CCD camera detector array circuits that provide for three primary color frames to be rapidly acquired. Rapidly acquiring the three subframes can be followed by a relatively slow reset of the filter while data is down-loaded. For still cameras there is no speed requirement for the reset and down-loading, while in video cameras this should be as rapid as possible, but not necessarily as rapid as the RGB sequencing. Since nematic liquid crystal cells have a faster rise time than fall time, to rapidly switch through the three primary spectra it is desirable to use only the unenergized to energized transitions. In the chromatic filter of FIG. 1, the switching sequence is 00 (red), 01 (green), 11 (blue), which uses only fast transitions. However, in the chromaticity compensating filter of FIG. 2, the switching sequence is 01 (blue), 10 (red), 11 (green), which includes a slow transition when the second liquid crystal cell is de-energized in switching from blue to red.

Figure 8:
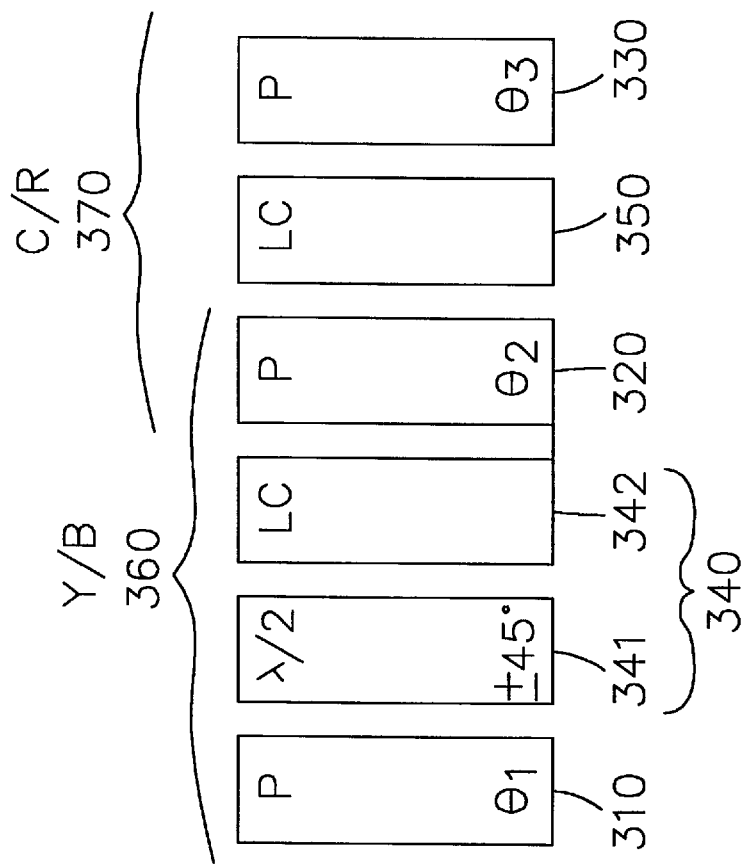
FIG. 8 is a two stage filter having two normally subtractive primary stages and having a bias retarder in the tuning unit of the first stage.

Fast transitions can be utilized in the chromaticity compensating filter by adding a passive half-wave bias retarder to the liquid crystal tuning unit, as shown in FIG. 8. Stage 360 has tuning unit 340 between polarizers 310 and 320 and stage 370 has tuning unit 350 between polarizers 320 and 330. Tuning unit 350 is simply a liquid crystal cell. Tuning unit 340 is a compound tuning unit made of liquid crystal cell 342 and bias retarder 341. The bias retarder is a passive retarder oriented at $\alpha_1=\pm 45°$. The liquid crystal cell is preferably a zero-twist cell oriented perpendicular to the bias retarder, at ±45°.

Bias retarder 341 preconditions the polarization by orthogonally transforming it in a chromatic fashion. The liquid crystal cell, in its unenergized state, transforms the light back, also in a chromatic fashion. Although the bias retarder and the unenergized liquid crystal cell both suffer from chromaticity, the two chromaticities effectively nullify one another. It is preferred that the chromaticity of the bias retarder match that of the liquid crystal cells, typically by having the same design wavelength. This nullification is particularly successful for zero-twist cells; twisted cells are less well matched by the bias retarder. The net result of the compound tuning unit is that the polarization is unchanged in the unenergized state. Thus the unenergized state is the normal state for the compound tuning unit. This is reversed from the simple tuning unit, wherein the energized state is the normal state. For the compound tuning unit, when the liquid crystal cell is energized it leaves the polarization unchanged, but the bias retarder orthogonally transforms the polarization. In contrast, for the simple tuning unit an orthogonal transformation is provided by the unenergized liquid crystal cell.

The addition of the bias retarder to the tuning unit of a stage therefore essentially exchanges the spectra of the energized and unenergized states. The spectra of the Y/B stage of the fast-transition chromaticity compensating filter of FIG. 8 are like the spectra shown in FIG. 2b, but yellow is produced in the 0 state and blue in the 1 state. Likewise the RGB spectra of the filter are like the FIG. 2d spectra, but black is the 10 state, blue is 11, red is 00 and green is 01. Therefore, to switch through the three primary colors the sequence 00, 01, 11 can be used, which contains only fast transitions. Note that this is the same switching sequence as for the filter of FIG. 1. The inclusion of a bias retarder in the Y/B stage is thus similar in terms of switching states to using a normally additive primary B/Y stage, but it preserves chromaticity compensation provided by using two normally subtractive primary stages.

In the example of FIG. 8, because the first stage is Y/B and the second stage is C/R, and because the bias retarder is in the first stage, the sequence of colors is 00 (red), 01 (green), 11 (blue). When the bias retarder is in the R/C stage, the sequence is 00 (blue), 10 (green), 11 (red). By appropriate choice of colors in each stage, such as incorporating a M/G stage, and by choice of which stage includes the bias retarder, any switching sequence can be obtained.

Figure 9:
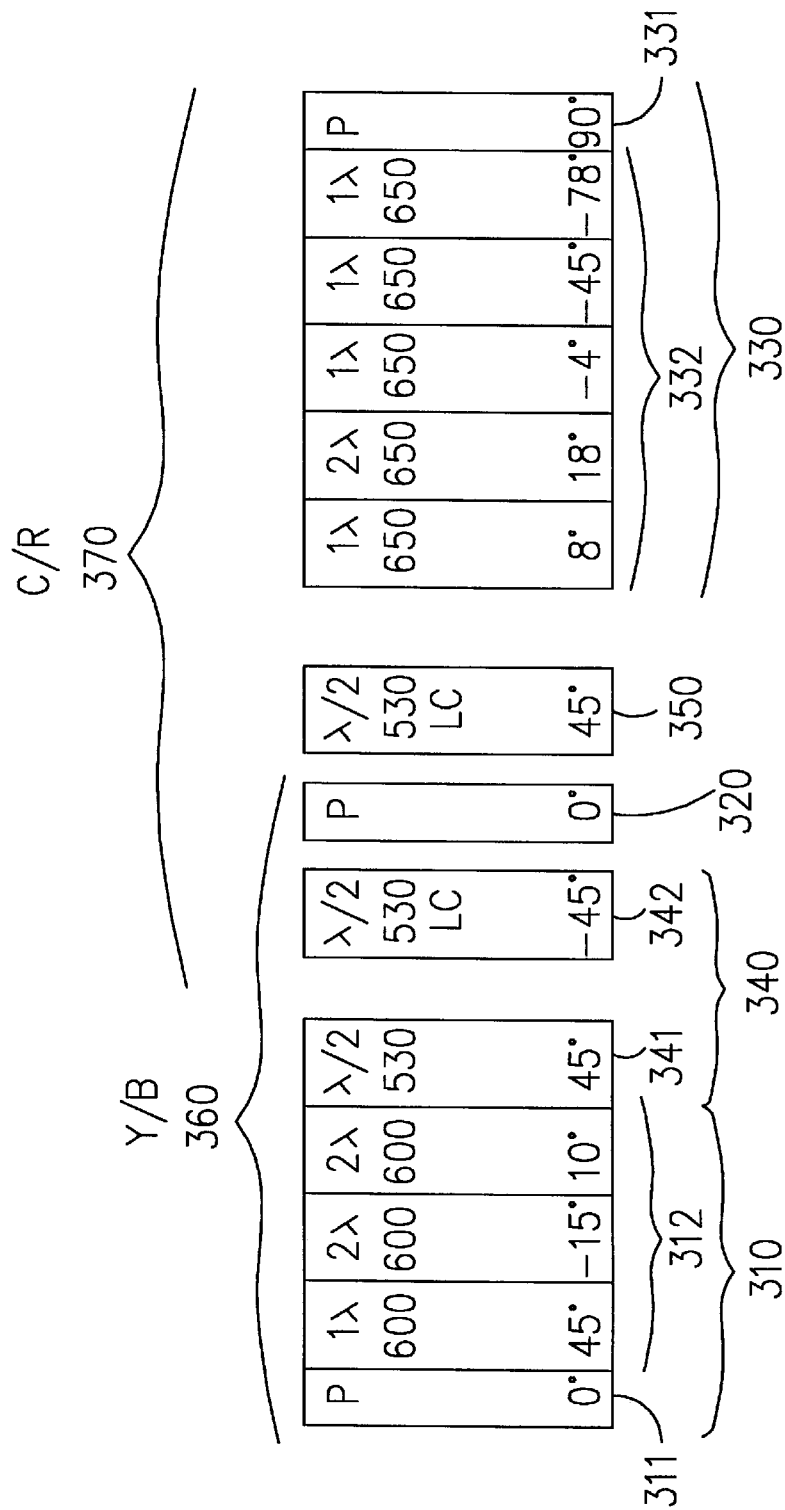
FIG. 9 is an embodiment of the filter of FIG. 8.

A specific embodiment of the fast-transition chromaticity compensating filter is shown in FIG. 9. Polarizer 310 is a PRS made of neutral polarizer 311 in combination with retarder stack 312. Compound tuning unit 340 comprises bias retarder 341 and zero-twist liquid crystal cell 342, both of which are half-wave retarders at a design wavelength of 530 nm. Polarizer 330 is a PRS comprising neutral polarizer 331 and retarder stack 332. The transmission spectra of the first stage are indistinguishable from the spectra of FIGS. 4a–b but yellow is produced in the unenergized state, and blue in the energized state. The second stage is the same as the second stage of the filter of FIG. 3, and accordingly the transmission spectra are as shown in FIGS. 5a–b.

The bias retarder in this example is positioned between the liquid crystal cell and the retarder stack, which facilitates device manufacturing. It can alternatively be positioned between the liquid crystal cell and the center polarizer, or between the retarder stack and neutral polarizer 311. The bias retarder can be oriented at ±45°, as can the two liquid crystal cells. The transmission of each configuration can be calculated or measured and the optimum configuration for the application selected.

Figure 10:
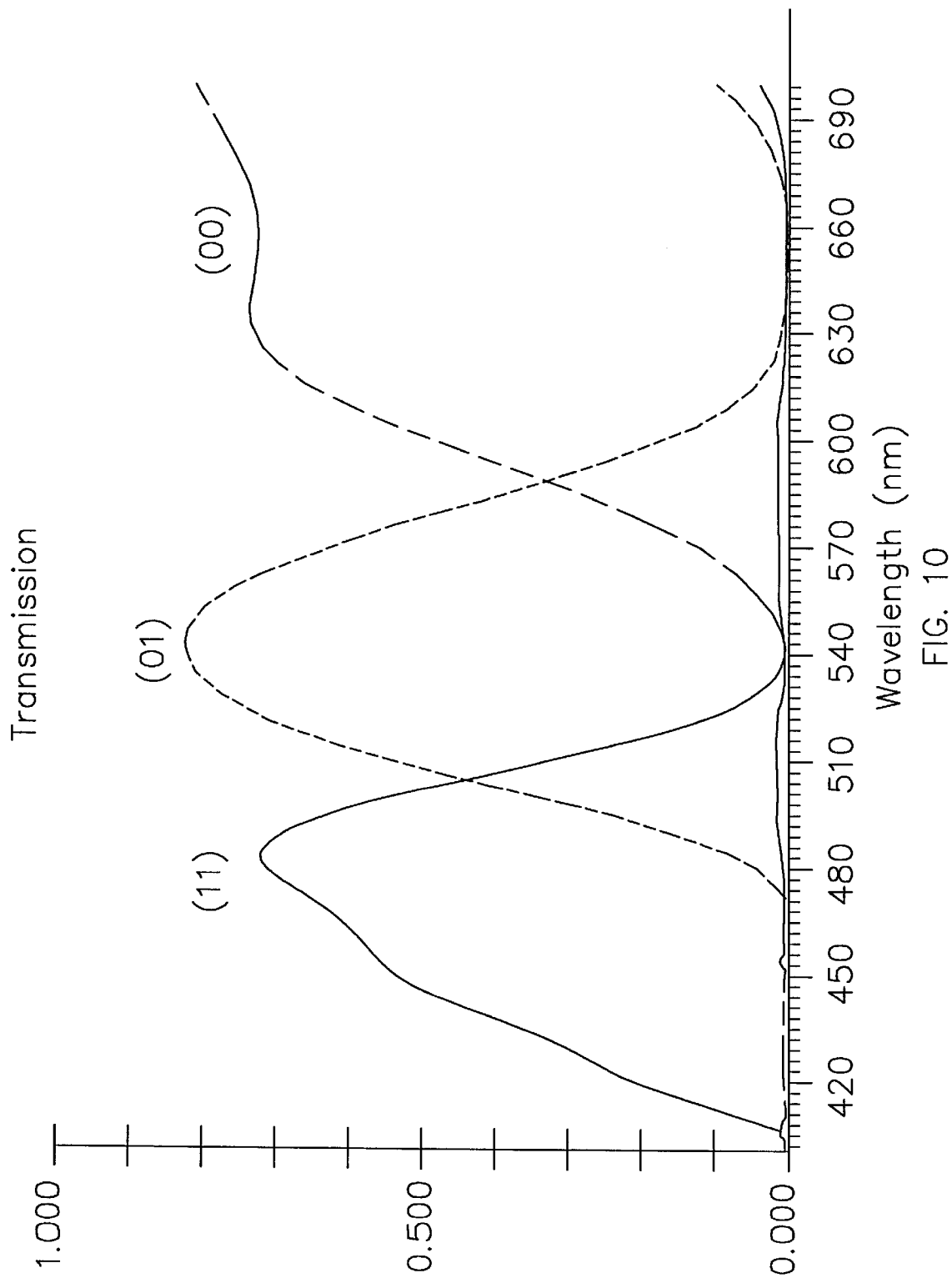
FIG. 10 is the RGB transmission of a chromaticity compensating filter with red suppression.

The effect of changing the orientation of the liquid crystal cell can be illustrated by modifying the filter of FIG. 9 so that liquid crystal cell 530 is at −45° instead of 45°. FIG. 10 shows the 11 (blue), 01 (green) and 00 (red) states of the modified filter. Loss due to non-ideal neutral polarizers is included in these spectra. In this filter, the red transmission in the 620–640 nm range is reduced by about 10–15% compared to the transmission for the filter of FIG. 9. This red suppression can have utility in certain applications, for example to offset the increased sensitivity in the red of certain CCD cameras and thereby provide improved color balancing.

Figure 11:
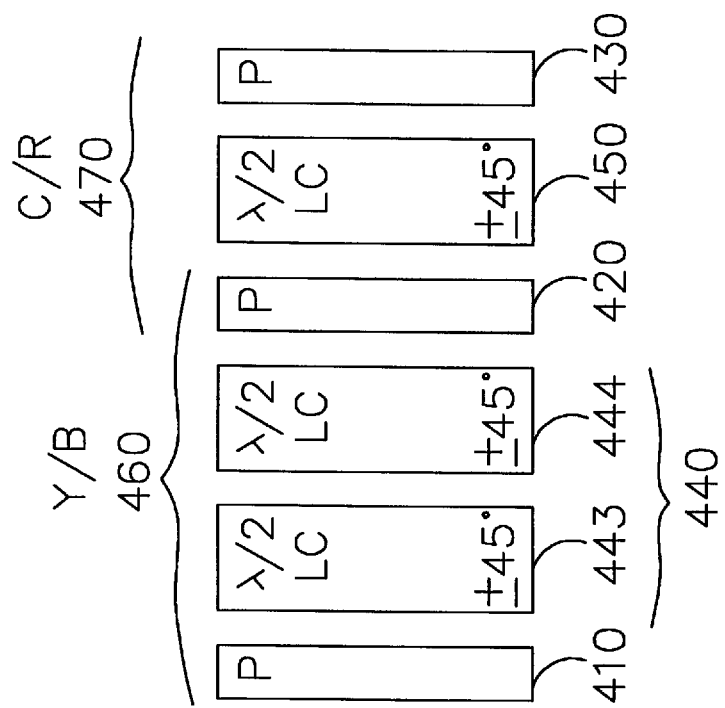
FIG. 11 is a two stage filter having a second liquid crystal cell in the tuning unit of one stage.

An alternative fast-transition compound tuning unit uses an additional liquid crystal cell as an active bias retarder, as illustrated in FIG. 11. Stage 460 has compound tuning unit 440 between polarizers 410 and 420. Stage 470 has liquid crystal cell 450 between polarizers 420 and 430. The compound tuning unit comprises first liquid cell 443 and second liquid crystal cell 444. The first liquid crystal cell is an active bias retarder oriented at $\alpha_1=\pm 45°$ and, like the passive bias retarder, it preconditions the polarization for the second. The two cells have crossed orientations so that the polarization transformation by the first is reversed by the second. The first and second liquid crystal cells have similar chromaticity so that when both are unenergized the chromaticity introduced by the first is nullified by the second.

Both stages normally transmit a subtractive primary. For the first stage, the normal state is obtained either when both cells are energized or when both cells are unenergized. An orthogonal transformation is obtained when one cell is energized and the other is unenergized. For the second stage, the normal state is obtained when the single liquid crystal cell is energized. Thus The filter has a blue output in both the 011 and the 101 switching states, a red output in 110 and 000, and a green output in 111 and 001. Although each primary color can be obtained in two switching states, the distortion due to chromaticity is different for each switching state and the preferred state can be chosen to suit the application. The three primaries can be obtained using only fast transitions with the sequence 000 (red), 011 or 101 (blue), 111 (green). For a filter having two liquid crystal cells in the C/R stage rather than the Y/B stage, the fast-transition switching sequence is 000 (blue), 110 or 101 (red), 111 (green).

Yet another embodiment of the fast-transition compound tuning unit utilizes a passive half-wave bias retarder oriented at ±67° or ±23° in one or both stages, as shown in FIG. 12. Stage 560 has compound tuning unit 540 between polarizers 510 and 520. Stage 570 has compound retarder 550 between polarizers 520 and 530. The compound tuning units have bias retarders 545 and 555 oriented at $\alpha_1$ and $\alpha_2$, respectively, in combination with liquid crystal cells 546 and 556. The bias retarders have a half-wave retardance at a design wavelength and are oriented at approximately ±67° or ±23°. Center polarizer 520 is at ±45°.

As in the previous embodiments, the bias retarders pre- or post-condition the polarization, with preconditioning occurring when the bias retarder is positioned before the liquid crystal cell and post-conditioning when it is after. The orientation of the bias retarders is at about ±22.5° or ±(90°–22.5°), so that they reflect light by about ±45°. Liquid crystal cell 546 either orthogonally transforms the polarization or leaves it unchanged, so that the polarization after tuning unit 540 is switchable between 45° and −45°. Accordingly polarizer 520 is at ±45°. After second compound tuning unit 550 the polarization is again switchable between 0° and 90° and so polarizer 530 is oriented at 0° or 90°.

The 45° reflection by the bias retarder introduces some ellipticity to the polarization, but not as much as an orthogonal transformation. The liquid crystal in the energized state leaves the polarization unchanged, retaining the ellipticity. In the unenergized state the polarization is orthogonally transformed. This compensates for the ellipticity introduced by the 45° reflection but goes beyond that and introduces some ellipticity of the opposite handedness. Thus both states are somewhat distorted, but neither has as much distortion as would the unenergized state without a bias retarder.

The splitting of chromaticity between both states is illustrated schematically in FIGS. 12*b–c*. The first stage transmits yellow in the unenergized state and blue in the energized state. The second stage transmits red in the unenergized state and cyan in the energized state. Since the polarization is transformed by the compound tuning unit both when the liquid crystal is energized and unenergized, neither switching state can properly be called the normal state. However, for fast transitions it is preferred that one state transmits a subtractive primary when energized, and the other state transmits a subtractive primary when unenergized.

The combined transmission of the two stages is illustrated in FIG. 12*d*. Switching through the three primaries can use the sequence 00 (red), 01 (green), 11 (blue), which contains only fast transitions. The switching sequence is the same as for the filter of FIG. 1, but the filter with two bias retarders provides chromaticity compensation. Note that the red and green states, which suffer from distortion in the filter of FIG. 1, are improved in the filter of FIG. 12, but the blue state which is undistorted in FIG. 1 has partial distortion in FIG. 12.

The orientations of the two bias retarders are about ±67° or about ±23°. Orientations at greater and lesser angles can also be used. The effect of changing the orientation of the bias retarder is a different splitting of the chromaticity between the two switching states. Depending on the application it may be desired to have less chromaticity in one state and tolerable to have more in the other. Therefore preferred angles specified herein are approximate angles. Angles greater or less by several degrees can also be useful.

Figure 13:
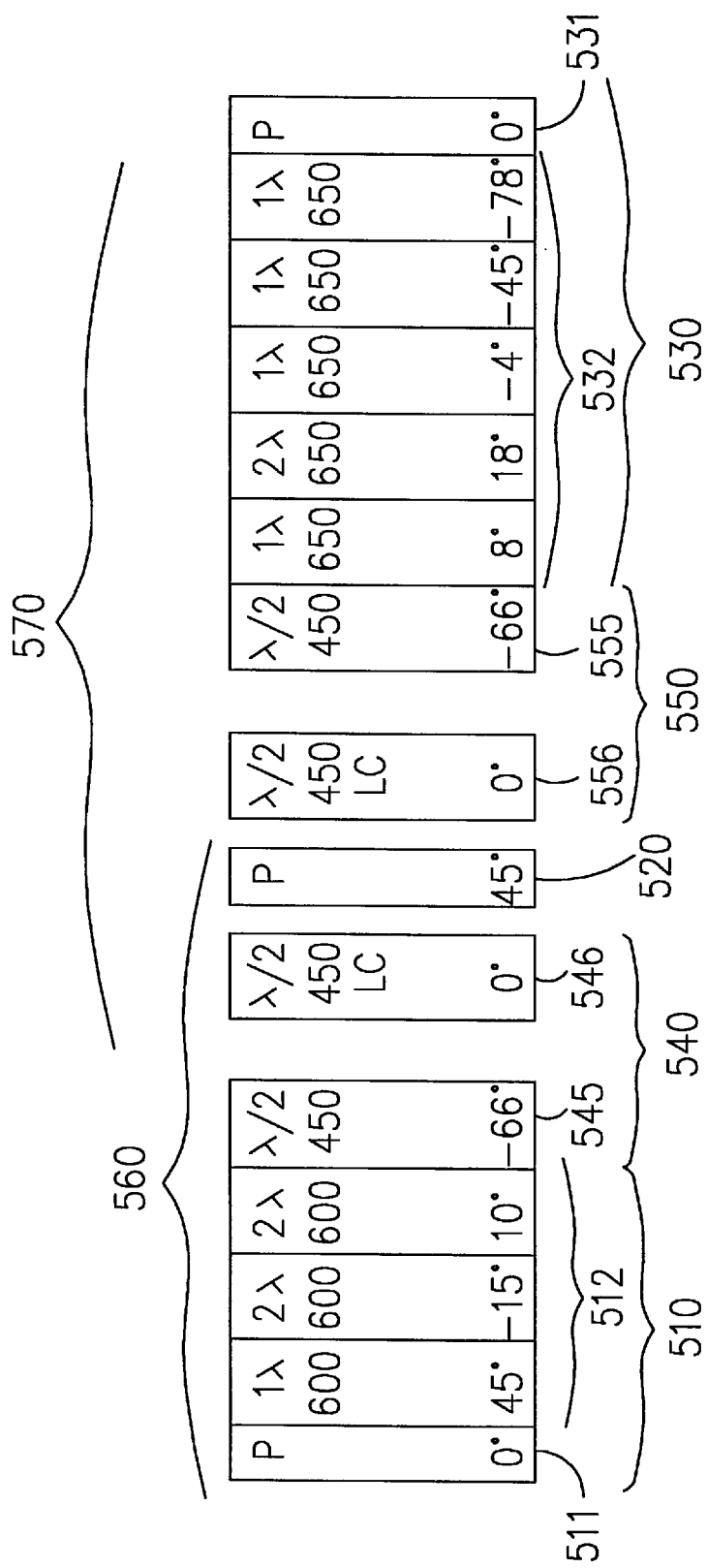
FIG. 13 is an embodiment of the filter of FIG. 12.
Figure 14:
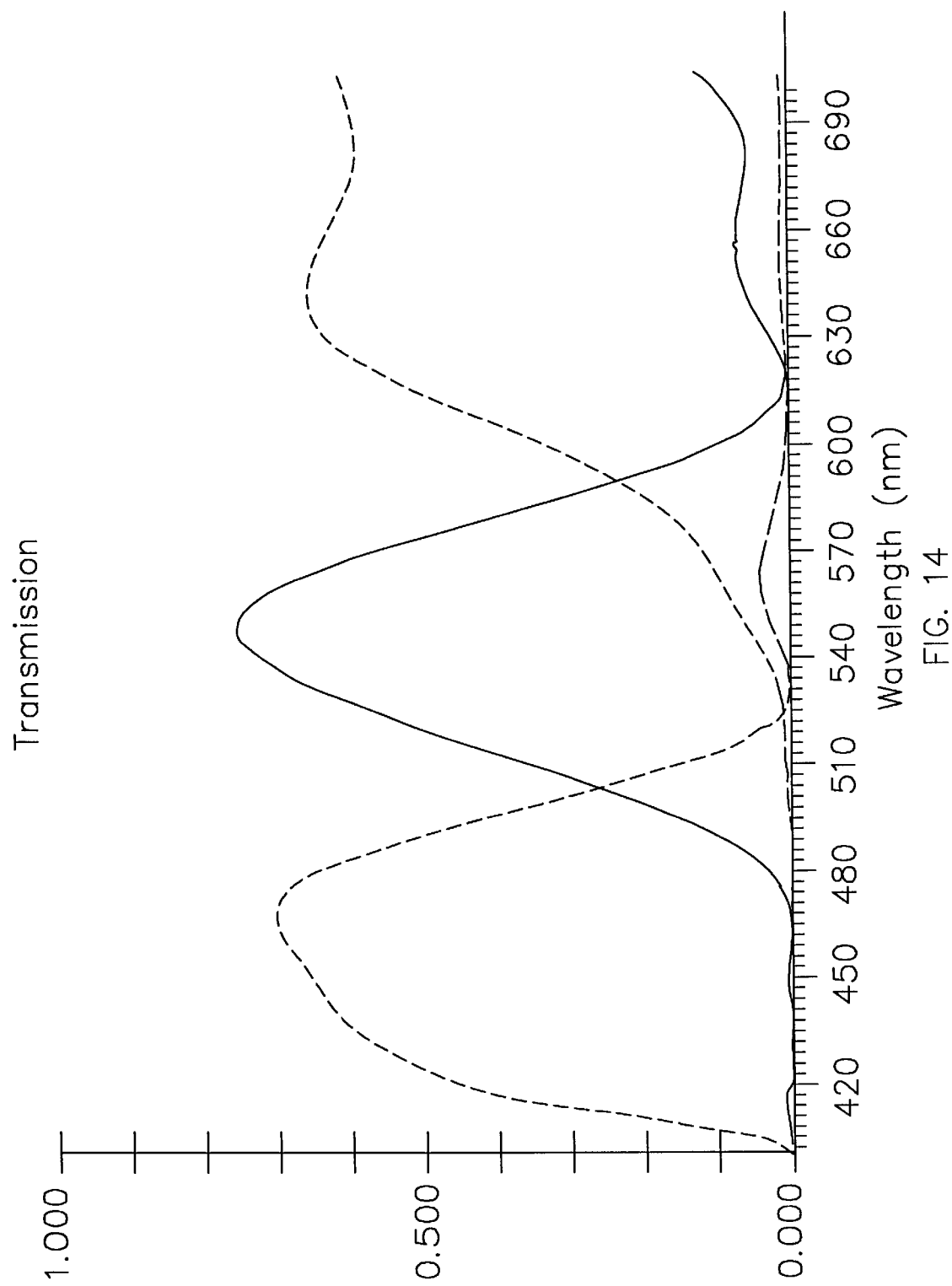
FIG. 14 is the RGB transmission of the filter of FIG. 13.

An embodiment of the chromaticity splitting filter is shown in FIG. 13. Stage 560 has color polarizer 510 and neutral polarizer 520 with tuning unit 540 therebetween. Stage 570 has color polarizer 530 and neutral polarizer 520 with tuning unit 550 therebetween. The tuning units are made of liquid crystal cells 546 and 556 with bias retarders 545 and 555. The bias retarders are oriented at about −66°, so the liquid crystal cells are oriented at 0°. For bias retarders at ±23° the liquid crystal cells would be oriented at 90°. The liquid crystal cells and bias retarders of both tuning units have a design wavelength of 450 nm, which is particularly easy to fabricate with π-cells. The RGB transmission of this filter is shown in FIG. 14. There are small side lobes in the blue and green states.

In the embodiment of FIG. 13 the bias retarders are positioned between the retarder stacks and the liquid crystal cells. This facilitates filter assembly. They can alternatively be positioned within the PRSs between the retarder stacks and the neutral polarizers, or between the liquid crystal cells and the center polarizer. The two bias retarders have the same orientation in this example, they can have different orientations and the liquid crystal cell orientations are selected accordingly.

The filter of FIG. 12 has bias retarders in both stages. Alternatively, a bias retarder at ±67° or ±23° can be placed in just one stage. The exit polarizer of that stage is accordingly oriented at ±45° with respect to the entrance polarizer. If the bias retarder is in the first stage then the second and third polarizers are both at ±45° so that the entrance and exit polarizers of the stage without a bias retarder are either parallel or crossed.

A chromaticity compensating filter and three types of compound tuning units are provided by this invention. A few preferred embodiments have been described. Many further embodiments fall within the range and scope of this invention. Different color polarizers can be used, including dye-type pleochroic polarizers and PRS polarizers having different retarder stacks from the illustrated embodiments. Hybrid filters can be made wherein the first and second stages of the filter use different active or passive bias retarder configurations. The orientations of the polarizers, liquid crystal cells and bias retarders can be adjusted to fine tune the filter transmission, as can the positioning of the elements within each stage. Similarly the design wavelengths of the liquid crystal cells and bias retarders can be chosen to optimize filter performance. The type of liquid crystal cell can be selected based on trade-offs between switching speed, manufacturing considerations and spectral response.

This invention further includes cameras, both still and video, using fast-transition chromaticity compensating filters in combination with photoreceiver arrays. The invention also includes liquid crystal displays using chromaticity compensating filters in combination with monochrome displays. The filter can be pixelated and each pixel independently switched.

I claim:

1. A chromaticity compensating filter, comprising:
    a first stage, comprising:
        a first and a second linear polarizer, oriented at $\theta_1$ and $\theta_2$, respectively, wherein at least one of said first and second polarizers is a color polarizer; and
        a first tuning unit, positioned between said first and second polarizers, and comprising a first nematic liquid crystal cell switchable between a first state wherein the polarization of light is orthogonally transformed and a second state wherein the polarization is unchanged;
        wherein said first stage normally transmits a first subtractive primary color; and
    a second stage in series with said first stage, comprising:
        said second linear polarizer and a third linear polarizer oriented at $\theta_3$, wherein at least two of said first, second and third polarizers are color polarizers; and
        a second tuning unit, positioned between said second and third polarizers, and comprising a second nematic liquid crystal cell switchable between a first state wherein the polarization of light is orthogonally transformed and a second state wherein the polarization is unchanged;
        wherein said second stage normally transmits a second subtractive primary color.

2. The chromaticity compensating filter of claim 1 wherein said first and second subtractive primary colors overlap in an additive primary color and wherein the design wavelengths of said first and second liquid crystal cells fall within the region of overlap.

3. The chromaticity compensating filter of claim 1 wherein said first tuning unit further comprises a first bias retarder having a half-wave retardance and oriented at $\alpha_1$.

4. The chromaticity compensating filter of claim 3 wherein $\theta_1=0°$, $\theta_2=0°$ or $90°$, $\theta_3=0°$ or $90°$ and $\alpha_1=\pm45°$.

5. The chromaticity compensating filter of claim 4 wherein said first and second subtractive primary colors overlap in an additive primary color and wherein the design wavelengths of said first and second liquid crystal cells fall within the region of overlap.

6. The chromaticity compensating filter of claim 3 wherein the design wavelength of said first bias retarder is approximately equal to the design wavelength of said first liquid crystal cell.

7. The chromaticity compensating filter of claim 3 wherein said first bias retarder is positioned between said first liquid crystal cell and said first polarizer.

8. The chromaticity compensating filter of claim 3 wherein said first bias retarder is positioned between said first liquid crystal cell and said second polarizer.

9. The chromaticity compensating filter of claim 3 wherein said first polarizer is a polarizer-retarder-stack comprising a neutral polarizer and a first retarder stack, and wherein said first retarder-stack is positioned between said first liquid crystal cell and the first bias retarder.

10. The chromaticity compensating filter of claim 1 wherein said color polarizers are polarizer-retarder-stacks, each polarizer-retarder-stack comprising:
    a neutral linear polarizer; and
    a retarder stack comprising two or more retarders, wherein the number, N, of said retarders and the retardances and orientations of said retarders are such that a first additive primary color spectrum is transmitted along a first polarization axis and the complementary first subtractive primary color spectrum is transmitted along a second, orthogonal, polarization axis.

11. The chromaticity compensating filter of claim 1 wherein said first subtractive primary is yellow and said second subtractive primary is cyan.

12. The chromaticity compensating filter of claim 1 wherein said first subtractive primary is magenta.

13. The chromaticity compensating filter of claim 1 wherein said color polarizers are dye-type pleochroic polarizers having a first additive primary color transmission spectrum along a first polarization axis and the complementary first subtractive primary color transmission spectrum along a second, orthogonal, polarization axis.

14. The chromaticity compensating filter of claim 1 wherein one of said color polarizers is a polarizer-retarder-stack and one is a dye-type pleochroic polarizer.

15. The chromaticity compensating filter of claim 1 wherein said first and second liquid crystal cells are each selected from the group consisting of electrically controlled birefringence nematic cells, twisted nematic cells, super twisted nematic cells, zero-twist nematic cells, and $\pi$-cells.

16. The chromaticity compensating filter of claim 15 wherein said first and second liquid crystal cells are electrically controlled birefringence cells or $\pi$-cells.

17. The chromaticity compensating filter of claim 1 wherein said first tuning unit further comprises a second nematic liquid crystal cell switchable between a first state wherein the polarization of light is orthogonally transformed and a second state wherein the polarization is unchanged.

18. A display comprising the chromaticity compensating filter of claim 1 and further comprising a monochrome display.

19. A chromaticity compensating nematic liquid crystal filter, comprising:
    a first stage, comprising:
        a first and a second linear polarizer, oriented at $\theta_1$ and $\theta_2$, respectively, wherein at least one of said first and second polarizers is a color polarizer; and
        a first tuning unit, positioned between said first and second polarizers, and comprising:
            a first nematic liquid crystal cell switchable between a first state wherein the polarization of light is orthogonally transformed and a second state wherein the polarization is unchanged; and
            a first bias retarder having a half-wave retardance and oriented at $\alpha_1$; and
    a second stage in series with said first stage, comprising:
        said second linear polarizer and a third linear polarizer oriented at $\theta_3$, wherein at least two of said first, second and third polarizers are color polarizers; and
        a second tuning unit, positioned between said second and third polarizers, and comprising a second nematic liquid crystal cell switchable between a first state wherein the polarization of light is orthogonally transformed and a second state wherein the polarization is unchanged.

20. The chromaticity compensating filter of claim 19 wherein $\theta_1=0°$, $\theta_2=0°$ or $90°$, $\theta_3=0°$ or $90°$ and $\alpha_1=\pm45°$.

21. The chromaticity compensating filter of claim 19 wherein $\theta_1=0°$, $\theta_2=\pm45°$, $\theta_3=\pm45°$, $\alpha_1=\pm67°$ or $\pm23°$.

22. The chromaticity compensating filter of claim 19 wherein said second tuning unit further comprises a second bias retarder having a half-wave retardance and oriented at $\alpha_2$.

23. The chromaticity compensating filter of claim 22 wherein $\theta_1=0°$, $\theta_2=\pm45°$, $\theta_3=0$ or $90°$, $\alpha_1=\pm67°$ or $\pm23°$ and $\alpha_2=\pm67°$ or $\pm23°$.

24. The chromaticity compensating filter of claim 23 wherein said first stage transmits a first subtractive primary spectrum when said first liquid crystal cell is in said second state and said second stage transmits a second subtractive primary spectrum when said second liquid crystal cell is in said second state.

25. The chromaticity compensating filter of claim 23 wherein said first stage transmits a first subtractive primary spectrum when said first liquid crystal cell is in said second state and said second stage transmits a second substractive primary spectrum when said second liquid crystal cell is in said first state.

26. The chromaticity compensating filter of claim 23 wherein said first stage transmits a first subtractive primary spectrum when said first liquid crystal cell is in said first state and said second stage transmits a second substractive primary spectrum when said second liquid crystal cell is in said first state.

27. The chromaticity compensating filter of claim 22 wherein said first bias retarder is positioned between said first liquid crystal cell and said first polarizer and said second bias retarder is positioned between said second liquid crystal cell and said third polarizer.

28. The chromaticity compensating filter of claim 22 wherein said first bias retarder is positioned between said first liquid crystal cell and said second polarizer and said second bias retarder is positioned between said second liquid crystal cell and said second polarizer.

29. The chromaticity compensating filter of claim 22 wherein said first and third polarizers are polarizer-retarderstacks comprising first and third neutral polarizers and first and third retarder stacks, respectively, and wherein said first retarder-stack is positioned between said first liquid crystal cell and said first bias retarder, and said second retarder-stack is positioned between said second liquid crystal cell and said second bias retarder.

30. The chromaticity compensating filter of claim 19 wherein said color polarizers are polarizer-retarder-stacks, each polarizer-retarder-stack comprising:

a neutral linear polarizer; and a retarder stack comprising two or more retarders, wherein the number, N, of said retarders and the retardances and orientations of said retarders are such that a first additive primary color spectrum is transmitted along a first polarization axis and the complementary first subtractive primary color spectrum is transmitted along a second, orthogonal, polarization axis.

31. The chromaticity compensating filter of claim 19 wherein said color polarizers are dye-type pleochroic polarizers having a first additive primary color transmission spectrum along a first polarization axis and the complementary first subtractive primary color transmission spectrum along a second, orthogonal, polarization axis.

32. The chromaticity compensating filter of claim 19 wherein one of said color polarizers is a polarizer-retarder-stack and one is a dye-type pleochroic polarizer.

33. The chromaticity compensating filter of claim 19 wherein said first, second and third linear polarizers are all color polarizers.

34. The chromaticity compensating filter of claim 19 wherein at least one of said color polarizers is a hybrid-polarizer-retarder-stack, comprising:

a dye-type pleochroic polarizer; and a retarder stack comprising two or more retarders, wherein the number, N, of said retarders and the retardances and orientations of said retarders are such that a first additive primary color spectrum is transmitted along a first polarization axis and the complementary first subtractive primary color spectrum is transmitted along a second, orthogonal, polarization axis.

35. The chromaticity compensating filter of claim 19 wherein said first and second liquid crystal cells are zero-twist nematic cells.

36. The chromaticity compensating filter of claim 35 wherein said first and second liquid crystal cells are electrically controlled birefringence cells or $\pi$-cells.

37. A filter array comprising a plurality of the chromaticity compensating filters of claim 19.

38. A camera comprising the chromaticity compensating filter of claim 19 and further comprising a receiver array in series with said filter.

39. A method of photography, comprising the steps of:

impinging light on the camera of claim 38;

sequentially switching said filter through three transmission states; and detecting images on said receiver array for each of said three transmission states.

40. The method of claim 39 wherein said sequential switching utilizes only unenergized to energized transitions of said first and second liquid crystal cells.

41. The method of claim 39 wherein said three transmission states correspond to red, green and blue transmission spectra.

* * * * *